United States Patent
Stenfelt et al.

(10) Patent No.: US 9,197,714 B2
(45) Date of Patent: Nov. 24, 2015

(54) USER INTEREST AND IDENTITY CONTROL ON INTERNET

(75) Inventors: John Stenfelt, Gothenburg (SE); Dirk Kopplin, Ytterby (SE); Stefan Rommer, Vastra Frolunda (SE); Hans Bertil Ronneke, Kungsbacka (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 354 days.

(21) Appl. No.: 13/500,386

(22) PCT Filed: Oct. 6, 2009

(86) PCT No.: PCT/EP2009/062942
§ 371 (c)(1),
(2), (4) Date: Apr. 5, 2012

(87) PCT Pub. No.: WO2011/042046
PCT Pub. Date: Apr. 14, 2011

(65) Prior Publication Data
US 2012/0198061 A1    Aug. 2, 2012

(51) Int. Cl.
*H04L 29/08* (2006.01)
*G06Q 30/02* (2012.01)
(Continued)

(52) U.S. Cl.
CPC .............. *H04L 67/306* (2013.01); *G06Q 30/02* (2013.01); *H04L 12/1407* (2013.01); *H04M 15/00* (2013.01); *H04M 15/58* (2013.01); *H04M 15/66* (2013.01); *H04W 4/24* (2013.01);
(Continued)

(58) Field of Classification Search
CPC ............... G06Q 30/02; H04L 12/1407; H04L 29/12367; H04L 61/2514; H04L 67/306; H04M 15/00; H04M 15/58; H04M 15/66; H04W 4/24; H04W 8/10
USPC ........................................................ 709/224
See application file for complete search history.

(56) References Cited

U.S. PATENT DOCUMENTS

| | | | |
|---|---|---|---|
| 7,734,019 B1 * | 6/2010 | Terpstra ........................... | 379/37 |
| 2002/0108057 A1 * | 8/2002 | Zhanhong Wu et al. ...... | 713/201 |

(Continued)

FOREIGN PATENT DOCUMENTS

| JP | 2006106948 A * | 4/2006 |
|---|---|---|
| WO | 02087265 A2 | 10/2002 |
| WO | 2008011242 A2 | 1/2008 |

OTHER PUBLICATIONS

Lei, G., et al. "Mobile charging support system faces fresh challenges", Leading Edge [Online], Apr. 2008, pp. 47-49, XP002587673.

(Continued)

*Primary Examiner* — Michael C Lai
(74) *Attorney, Agent, or Firm* — Rothwell, Figg, Ernst & Manbeck P.C.

(57) ABSTRACT

The present invention relates to a solution for handling customer activity when connecting to a wireless communication network and in particular for statistics of customer activity using the network. This is provided in a number of aspects such as methods, node, and system for reporting user profile statistics from deep packet inspection of data packets in a packet data network (100) to a policy and charging rules function entity (104) which in turn informs a subscriber usage profile repository (106), i.e. SUPR. The SUPR provides access to external application servers (108) to the subscriber usage profile information after access control.

17 Claims, 4 Drawing Sheets

(51) Int. Cl.
    *H04L 12/14* (2006.01)
    *H04M 15/00* (2006.01)
    *H04W 4/24* (2009.01)
    *H04W 8/10* (2009.01)
    *H04L 29/12* (2006.01)

(52) U.S. Cl.
    CPC .......... *H04W 8/10* (2013.01); *H04L 29/12367* (2013.01); *H04L 61/2514* (2013.01)

(56) References Cited

U.S. PATENT DOCUMENTS

| | | | |
|---|---|---|---|
| 2004/0106433 A1* | 6/2004 | Ooki et al. | 455/561 |
| 2004/0237103 A1* | 11/2004 | Kondo et al. | 725/37 |
| 2005/0243789 A1* | 11/2005 | Dinello et al. | 370/341 |
| 2009/0055267 A1* | 2/2009 | Roker | 705/14 |
| 2009/0138427 A1* | 5/2009 | Kalavade | 707/1 |
| 2009/0177650 A1* | 7/2009 | Petersson et al. | 707/5 |
| 2009/0198569 A1* | 8/2009 | Ou et al. | 705/10 |
| 2011/0022702 A1* | 1/2011 | Riley et al. | 709/224 |

OTHER PUBLICATIONS

3GPP TSG SA WG2 Meeting #72, Mar. 30-Apr. 3, 2009, Hangzhou, China, "Policy Enhancements," TD S2-092661, 6 pages.

* cited by examiner

USER INTEREST AND IDENTITY CONTROL ON INTERNET

CROSS-REFERENCE TO RELATED APPLICATIONS

This application is a 35 U.S.C. §371 National Phase Entry Application from PCT/EP2009/062942, filed Oct. 6, 2009 (published as WO 2011042046), and designating the United States.

TECHNICAL FIELD

The present invention relates to a solution for handling customer activity when connecting to a wireless communication network and in particular for statistics of customer activity using the network.

BACKGROUND

The use of packet based communication in wireless networks extends the use of wireless devices into packet based networks such as Internet or operator specific networks and services available in these networks. There is an interest from operators or service providers to provide increasingly better service to the users and to offer added functionality and ease the use of services and increase availability of the networks for the users.

With state-of-the-art technology such as Evolved Packet Core, SIM based authentication, Deep Packet Inspection and Policy and Charging Control (PCC), mobile operators can gather potentially extensive information about each subscriber, e.g. protocols they use, URI's or sites on Internet they visit, their identity. This information can with some limitations be transformed into end-user interest profiles. The mobile operator may also have other information of its subscribers, e.g. interest profiles gathered through end-user surveys or queries, which may complement in building the end-user interest profiles.

So far operators have been able to use the information about the usage of services to differentiate the subscriber's charging or to control the access in different ways (e.g. stop access to certain sites or services, control the bandwidth etc).

PCC is defined to work in this direction only. It has however been difficult to address the growing market for subscriber usage and behavior analysis and extend the business beyond traditional use cases and find new business opportunities, e.g. sell usage/behavior information to third party companies.

SUMMARY

It is therefore an object of the present invention to provide solutions that addresses these problems.

The solution according to the present invention enables mobile operators to take advantage of having authenticated users and being able to monitor what users do by Deep Packet Inspection (DPI). The gathered information is processed and stored in a new entity Subscriber Usage Profile Repository (SUPR), which is indexed by IMSI and currently used IP address(es). The IP address(es) in the SUPR are updated whenever changes occur from user activities, i.e. attach/detach, bearer activations/deactivations, or IP address changes for other reasons. If the user is connected to Internet via an IPv4 NAT or Firewall, the assigned public IP address and optionally port number may also be stored in the SUPR.

Service providers on Internet may then in real-time access the SUPR. When, for example, someone is accessing a web-server, the web-server may by using the source IP address in the HTTP-request, retrieve user profile information from the SUPR and assemble an HTTP-response with content based on the user's interest profile. This may be as simple as adding advertisements on the HTML page according to the interest of the user, or it may be any kind of personalization or content tailoring based on the user profiles.

An alternative for the operator to use the SUPR information, is to sell subscriber interest profiles to service providers. For example: "provide me with a list of persons (name, address, email address) which have accessed any of these 10 motor-web-sites on Internet the last 6 months". The provisioning of the information may be manual and offline, but it may also be automated and provided to the service provider in a similar way as for the real-time alternative above, e.g. XML based request/response to the SUPR server.

The mobile operator may then charge service providers for the information they have received. This is a new revenue stream for the mobile operator which may increase the ARPU even for "bit pipe providers".

The revenue for a specific user is also to some extent related to total bandwidth used by the user. That is, a user consuming more bandwidth is likely to visit more web-sites on Internet and hence may give the mobile operator a bigger income from usage profiles.

In short, thanks to the possibility of selling usage profiles, even for a mobile broadband subscriber paying a flat monthly fee–higher usage=higher revenue!

This is provided in a number of aspects in which a first is a method in a core part of a wireless communication network. The method comprises the steps of:
  receiving user statistics from deep packet inspection;
  storing user information comprising user statistics together with user identity information;
  receiving a request from an application server, relating to an IP address and requesting user information; and
  providing at least part of stored user information to the application server.

The method may further comprise the steps of:
  receiving an attachment request from a user equipment, i.e. UE, and assigning at least one IP address to the UE;
  updating a policy and charging rules function, i.e. PCRF, with at least one IP address assigned for the UE;
  updating a subscriber usage profile repository, i.e. SUPR, with information relating to the UE;
  enabling deep packet inspection of data relating to the UE and assigned IP address and retrieving user statistics using a Policy and Charging Enforcement Function, i.e. PCEF;
  reporting user statistics information to the PCRF;
  forwarding user statistics information to the SUPR;
  providing user information deducible from the user statistics information and/or the user identity information to at least one application server requesting such information; and
  storing identity information relating to application servers.

The user statistics may comprise at least one of visited URI's by the UE, application used by the UE, protocols used by the UE, and type of services used by the UE. The SUPR may store information related to an identifiable UE. The deducible user information may be provided in an XML format. A network address translation unit provides information about relation between public and private IP addresses to the SUPR.

The method may further comprise a step of authenticating the application server before providing user information to the application server. The method may further comprise a step of updating the PCRF and SUPR if IP address is changed for the UE. The method may further comprise a step of handling multiple IP addresses.

Another aspect of the present invention is provided, a node in wireless communications network. The node comprising a processor, a computer readable storage medium, and a communication interface. The processor may be arranged to execute instructions sets stored in the storage medium, using the communication interface, for:

receiving an attachment request from a user equipment, i.e. UE, and assigning at least one IP address to the UE;

updating a policy and charging rules function, i.e. PCRF, with at least one IP address assigned for the UE;

updating a subscriber usage profile repository, i.e. SUPR, with information relating to the UE;

enabling deep packet inspection of data relating to the UE and assigned IP address and retrieving user statistics using a Policy and Charging Enforcement Function, i.e. PCEF;

reporting user statistics information to the PCRF;

forwarding user statistics information to the SUPR;

providing user information deducible from the user statistics information and/or the user identity information to application servers requesting such information; and storing identity information relating to application servers.

Yet another aspect of the present invention is provided, a business method related to a communications network. The business method may comprise the steps of:

storing user information relating to an identifiable user and user usage profile;

receiving a request relating to the user information from an external application server comprising an IP address;

providing at least past of the user information to the external application; and charging for the providing of the user information.

The business method may further comprise a step of comparing user ID connected to IP address with recent requests.

Still another aspect of the present invention is provided, a core network in a wireless communication network. The core network may comprise a gateway and a policy and charging rules function entity. The gateway may be arranged to provide communicative connection with a user equipment, i.e. UE, to provide access to a packet data network for the UE, provide deep packet inspection, i.e. DPI, of data packets passing through the gateway, determine user statistics from the DPI, and provide user statistics to the policy and charging rules function entity, i.e. PCRF. The network may further comprise a subscriber usage profile repository receiving user statistics information from the PCRF and providing access to the subscriber usage information to application servers requesting such information. The gateway may be one of a PGW or a GGSN and the network may further comprise at least one of network address translation entity and/or firewall.

The invention enables mobile operators to take advantage of having authenticated users and being able to monitor what users do by Deep Packet Inspection (DPI). A new revenue stream can be created by offering this information in form of user interest profiles and/or user identities to third party enterprises. The third party enterprise retrieves this information in real time using the IP address of the user.

The invention may increase the market potential for CPG's equipped with the proposed functionality. It may also increase the potential for Fixed Mobile Convergence and using DPI enabled GWs also for fixed accesses.

BRIEF DESCRIPTION OF THE DRAWINGS

In the following the invention will be described in a non-limiting way and in more detail with reference to exemplary embodiments illustrated in the enclosed drawings, in which.

DETAILED DESCRIPTION

Figure 1:
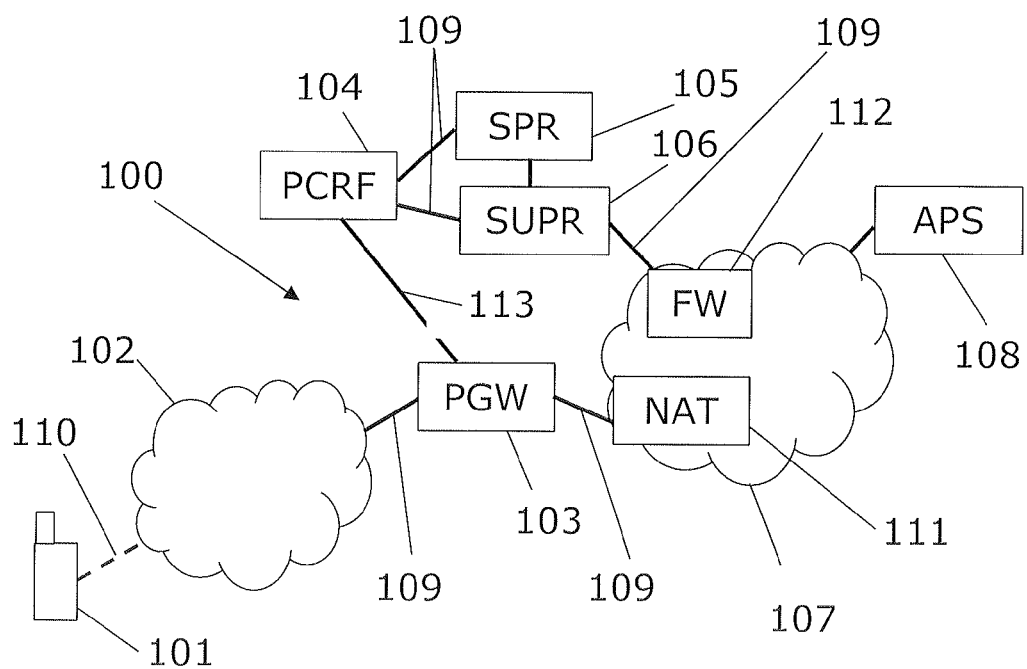
FIG. 1 illustrates schematically a network according to the present invention.

In FIG. 1 reference numeral 100 denotes a core network configuration according to the present invention. The network comprises a gateway 103, e.g. a Packet Data Network GW (PGW) connected to a Policy and Charging Rules function (PCRF) entity 104. The gateway is also connected to an access network 102 in turn communicating wirelessly 110 with user equipment 101. Furthermore, the network comprises a Subscription Profile Repository (SPR) 105 and a Subscriber Usage Profile Repository (SUPR) 106. Both the SPR and the SUPR are connected to the PCRF and furthermore connected to each other. Both the PGW and the SUPR are connected to a packet data network 107 (PDN), e.g. Internet. Optionally a Network Address Translation (NAT) entity 111 is located between the PGW and the PDN. It should be noted that the core network 100 comprise further nodes not shown such as support gateway, e.g. SGSN, mobility node, e.g. Mobility Management Entity (MME), and so on. Furthermore, routers, switches, cabling, and other network communication enabling devices are used to maintain physical links between nodes in the network(s). A firewall (FW) 112 may be located between the SUPR and the PDN in order to provide a secure location of the SUPR. Application Servers (APS) 108 may be connected to the PDN and provide services to UEs connected to the PDN via the access network.

Figure 2:
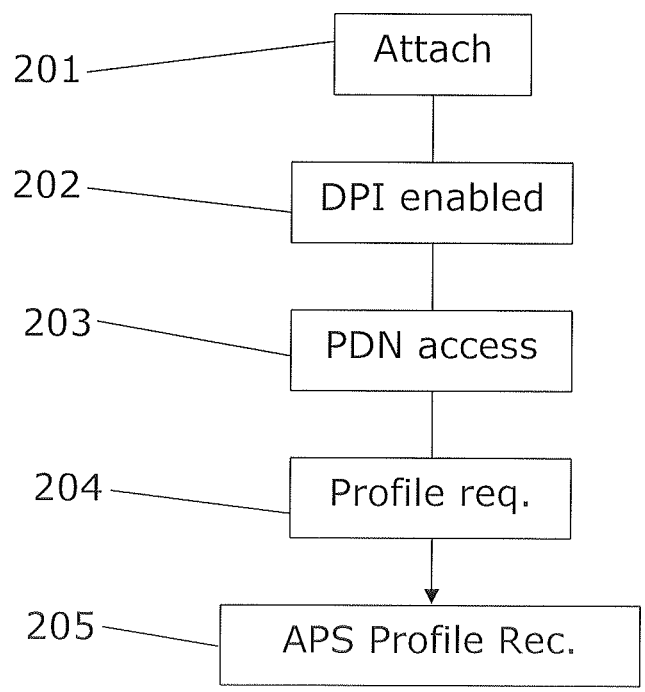
FIG. 2 illustrates schematically a method according to the present invention.

In the present invention it is provided a solution for handling user statistics and providing information about these statistics to application servers connected to the PDN. The process according to the present invention may be described as follows with reference to FIGS. 1 and 2:

201. A new user attaches to the mobile operators network and one or more IP addresses are assigned to the UE. The PCRF is updated with the assigned IP address(es) as part of the 'Create IP-CAN Session' or 'IP-CAN Session Modification'. The SUPR is immediately updated by the PCRF when it becomes aware of any changes of IP addresses for the UE. For operators assigning IPv4 addresses to their subscribers, but not using public IPv4 addresses, a NAT or Firewall doing address translations may be placed at the boarder to Internet. The NAT/Firewall would then update the SUPR each time a mapping is created or deleted between private and public IPv4 addresses. The IPv4 port number may also be part of and significant in this mapping and updated to the SUPR.

202. Deep Packet Inspection (DPI) is enabled for configured PDNs, e.g. Internet. A Policy and Charging Enforcement Function (PCEF) in the PGW has an extended function for collecting usage statistics e.g. URI's, sites visited on Internet, protocols used, or anything else that can be deduced from inspecting the IP packets generated by the user, and associated to a specific interest. The usage statistics is reported over a suitable interface, e.g. an extended Gx interface 113, to the PCRF, which forwards the information to the SUPR together with the IMSI for subscriber identity. The information in processed and stored in the SUPR as 'user profiles', searchable by the users currently used IP address(es), and for convenient use by service provider's application servers on Internet.

203. The UE starts to access a web-server on Internet; the web-server where the provider has an agreement with one or more mobile operators. From the source IP address in the HTTP-request the web-server knows which and if the request originates from a mobile operator which it has an agreement on user profiles with.

204. If a web-server receives a request from an IP address belonging to an operator with which the web-server company has an agreement, a 'user profile request' is sent to the SUPR server of that operator. Parameters in the request include user identity of the web-server company and its password according to business agreement between the Service Provider and the Mobile Operator. Parameters may also include parameters which indicate different levels of requested information, different interest areas etc, e.g. user profiles of "type A" or "type B" or with/without the users identity (MSISDN, Name, Address, e-mail address etc). A 'user profile response' is returned to the web-server with requested information if any information was found. The information is preferably provided on XML-format. The SUPR-node maintains charging information what profiles have been provided to the service provider for later charging of the service provider.

205. The web-server receives the user profiles and uses the information to process the HTTP-request and assemble an HTML page which is returned to the UE in a HTTP-response. Advertisement targeting the users special interest may e.g. be included in the HTML-page. If requested and received, the web-server may also use the identity of the user of its web-site for any later relational marketing campaigns or any statistical purposes.

Regularly, e.g. on a monthly basis, the mobile operator bills the service providers it has agreements with.

The user interest profiles that are stored in the SUPR, does in this description above originate from DPI. However they may also originate from customer inquiries, i.e. forms directly filled in by subscribers. The identity information such as name, address, e-mail address, phone numbers, etc, should originate from the subscription information the mobile operator has from each subscriber.

Figure 3:
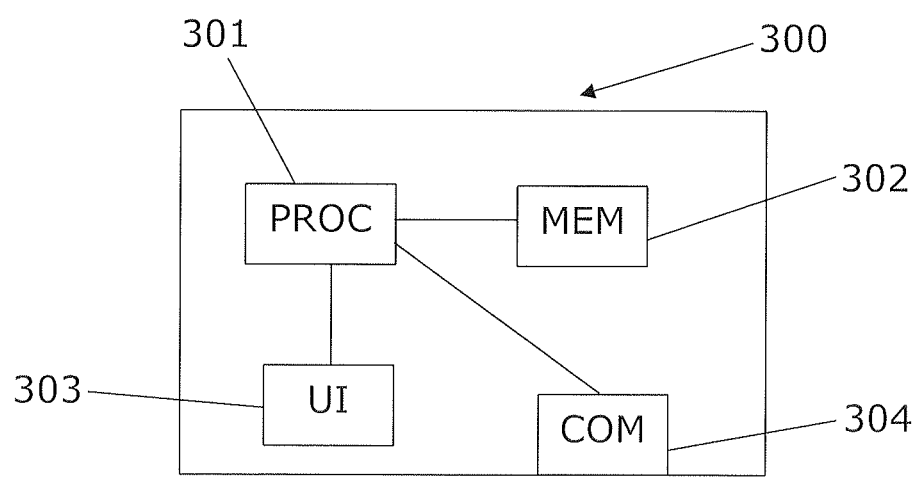
FIG. 3 illustrates schematically in a block diagram a device according to the present invention.

FIG. 3 shows a node in the infrastructure network operating parts of the method according to the present invention. This node may be for instance a gateway node, e.g. PGW or GGSN. The node comprises a processing unit 301, e.g. a microprocessor or Digital Signal Processor (DSP), arranged to execute instruction sets stored in a memory unit 302 of volatile and/or non-volatile type. The memory unit is arranged as a computer readable storage medium. Furthermore, the node comprises at least one communication interface 304 and optionally a user interface 303. The instruction sets are configured to execute parts of the method of the present invention and the role of the node is shown in relation to FIG. 2 but will also be described in relation to FIG. 4 below. It should be appreciated that alternatively the processing unit may be arranged to execute hardware instructions sets: the processing unit may be an Application Specific Integrated Circuit (ASIC), Field Programmable Gate Array (FPGA), or similar device.

Figure 4:
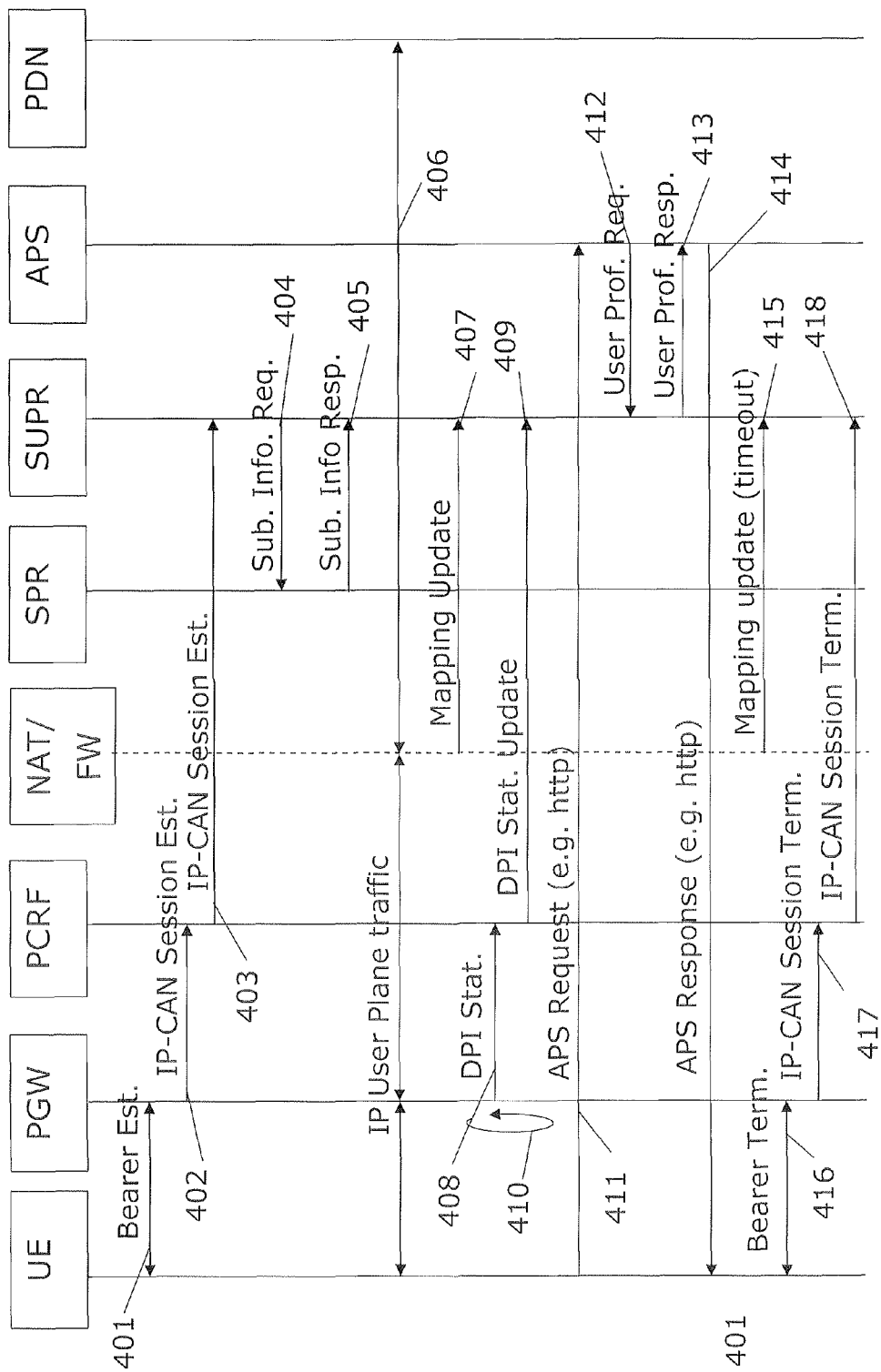
FIG. 4 illustrates schematically in a signaling diagram an overall process according to the present invention.

FIG. 4 shows an example of the signaling process for a UE attaching to the network, the core network monitoring with DPI the activities of the UE, and providing information to Application Server(s) located on the PDN. The UE and PGW communicate bearer establishment messages 401, via the access network. The PGW in turn transmits 402 IP-CAN Session establishment communications to the PCRF with IMSI and IP address information; the PCRF in turn forwards 403 this information to the SUPR. The SUPR communicates a Subscriber Info Request 404 with the Subscriber database (SPR) with information relating to IMSI; the SPR in turn responds with a Subscriber Info Response 405 with information relating to at least one of IMSI, MSISDN, name, address, email address, phone number, user provided interest profile, user statistics profile, and any other information that may be of interest.

The setup part is now basically done and the session continues with user plane traffic 406 between the UE and the PDN via the PGW and optionally via a NAT and/or FW. If NAT is used, triggered by IP packets sent from the UE, mapping update 407 may be performed; e.g. mapping private IP address with public IP address and port number.

During the IP session the PGW continually obtains statistics of the user activity through DPI and transmits 408 repeatedly 410 to the PCRF which in turn updates 409 the SUPR with relevant information.

When a UE makes a request 411 to an application server (APS), e.g. a HTTP request or similar, the APS may make a user profile request 412 to the SUPR and if the APS is allowed to connect to the SUPR, the SUPR may respond 413 with a user profile response comprising user profile information and the APS may respond 414 to the UE request in accordance with the user profile information.

If the IP session is timed out or the public/private IP address of the UE is changed a mapping update 415 may be performed. If a time out event triggers a mapping update, the mapping of the private to public IP address/port number is removed. The SUPR may optionally hold a register with historical mappings for some time in order to being able to control if a user re-attaches shortly in time. This may be useful for instance if the APS is charged for information relating to a UE; if the UE re-attaches shortly in time, the APS may not be interested in being charged again since this may be seen as a double charging of the information. If the UE is located in an environment with less optimal connection quality, the connection may be renewed quite often and thus possibly given new IP addresses often.

If the UE or core/access network actively terminates the connection, bearer termination communications 416 will be exchanged between the UE and PGW. The PGW will send a message indication IP-CAN session termination 417 to the PCRF which in turn will inform 418 the SUPR about this together with information of IMSI and IP address.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, that the invention may be at least in part implemented by means of both hardware and software, and that several "means" or "units" may be represented by the same item of hardware.

The above mentioned and described embodiments are only given as examples and should not be limiting to the present invention. Other solutions, uses, objectives, and functions within the scope of the invention as claimed in the below described patent claims should be apparent for the person skilled in the art.

ABBREVIATIONS

DPI Deep Packet Inspection
EPC Evolved Packet Core
GW GateWay
HTML HyperText Markup Language
HTTP HyperText Transfer Protocol
IP Internet Protocol
IP-CAN Internet Protocol Connectivity Access Network MS Mobile Station
PCC Policy and Charging Control
PCEF Policy Control Enforcement Function
PCRF Policy Control Rules Function
PDN Packet Data Network
PDN-GW Packet Data Network Gateway
PGW Packet Data Network Gateway
SPR Subscription Profile Repository
SUPR Subscriber Usage Profile Repository
UE User Equipment
URI Uniform Resource Identifier, e.g. URL: Uniform Resource Locator
XML eXtensible Markup Language

The invention claimed is:

1. A method in a core part of a wireless communication network that includes a policy and charging rules function (PCRF) node and a subscriber usage profile repository (SUPR), comprising the steps of:
   receiving from a user equipment (UE) a request to attach to the wireless communication network and assigning at least one IP address to the UE;
   updating the PCRF node with the at least one IP address assigned to the UE:
   updating the SUPR with information relating to the UE;
   enabling deep packet inspection of data relating to the UE and the UE's assigned IP address and retrieving user statistics using a Policy and Charging Enforcement Function (PCEF) node;
   reporting information about the user statistics to the PCRF node;
   forwarding the information about the user statistics to the SUPR;
   storing user profile information comprising the user statistics together with user identity information;
   receiving a request from an application server, the request identifying an IP address and requesting user profile information;
   providing user profile information deducible from said information about the user statistics information or from user identity information to the application server requesting the user profile information;
   storing information identifying the application server;
   determining that a new IP address has been assigned to the UE; and
   in response to determining that the new IP address has been assigned to the UE, updating the PCRF node with the new IP address and storing the new IP address in the SUPR.

2. The method according to claim 1, wherein user statistics comprise at least one of visited URI's by the UE, application used by the UE, protocols used by the UE, and type of services used by the UE.

3. The method according to claim 2, wherein information stored in the SUPR is related to an identifiable UE.

4. The method according to claim 2, wherein user statistics comprise the type of services used by the UE.

5. The method according to claim 1, wherein the deducible user profile information is provided in an XML format.

6. The method according to claim 1, further comprising a step of authenticating the application server before providing the user profile information to the at least one application server.

7. The method according to claim 1, further comprising a network address translation unit providing information about a relationship between public IP addresses and private IP addresses to the SUPR.

8. The method according to claim 1, further comprising a step of handling multiple IP addresses.

9. The method of claim 1, wherein storing the user profile information comprises storing the user profile information in the SUPR such that the stored information in the SUPR is indexed by the UE's currently assigned IP address and the UE's international mobile subscriber identity (IMSI).

10. The method of claim 9, wherein the user statistics corresponding to the UE are received at the PCRF node from a Policy and Charging Enforcement Function (PCEF) node, the method further comprising the SUPR receiving the user profile information comprising the user statistics from the PCRF node.

11. The method according to claim 1, the method further comprising:
   the SUPR submitting a request to a subscription profile repository (SPR) for information relating to an international mobile subscriber identity (IMSI); and
   the SPR responding with information related to the IMSI.

12. A system in a wireless communications network, comprising:
   one or more processors;
   one or more computer-readable storage media; and
   one or more communication interfaces, wherein the one or more processors are arranged to execute instructions sets stored in the one or more computer-readable storage media for:
      receiving from a user equipment (UE) a request to attach to the wireless communication network and assigning at least one IP address to the UE;
      updating a policy and charging rules function (PCRF) node with the at least one IP address assigned to the UE;
      updating a subscriber usage profile repository (SUPR) with information relating to the UE;
      enabling deep packet inspection of data relating to the UE and the UE's assigned IP address and retrieving user statistics using a Policy and Charging Enforcement Function (PCEF) node;
      reporting information about the user statistics to the PCRF node;
      forwarding the information about the user statistics to the SUPR;
      providing user profile information deducible from said information about the user statistics or from user identity information to application servers requesting the user profile information;
      storing information identifying the application servers;
      determining that a new IP address has been assigned to the UE; and
      in response to determining that the new IP address has been assigned to the UE, updating the PCRF node with the new IP address and storing the new IP address in the SUPR.

13. A method in a communications network that includes a policy and charging rules function (PCRF) node and a subscriber usage profile repository (SUPR), the method comprising:
   storing user profile information relating to an identifiable user equipment (UE) and to a user usage profile;
   receiving from the UE a request to attach to the communications network and assigning at least one IP address to the UE;
   updating the PCRF node with the at least one IP address assigned to the UE:
   updating the SUPR with information relating to the UE;

enabling deep packet inspection of data relating to the UE and the UE's assigned IP address and retrieving user statistics using a Policy and Charging Enforcement Function (PCEF) node;

reporting information about the user statistics to the PCRF node;

forwarding the information about the user statistics to the SUPR;

receiving a request relating to the user profile information from an external application server, the request identifying an IP address assigned to the UE;

providing user profile information deducible from said information about the user statistics information or from user identity information to the external application server requesting the user profile information;

storing information identifying the external application server;

charging for the providing of the user profile information;

determining that a new IP address has been assigned to the UE; and in response to determining that the new IP address has been assigned to the UE, updating the PCRF node with the new IP address and storing the new IP address in the SUPR.

14. The method according to claim 13, further comprising comparing a user ID connected to the IP address in the request with user IDs of recent requests.

15. A core network in a wireless communication network, comprising:

a gateway;

a subscriber usage profile repository (SUPR); and a policy and charging rules function (PCRF) node, wherein the gateway is arranged to:

provide communicative connection with a user equipment (UE) to provide access to a packet data network for the UE by receiving a request to attach to the wireless communication network and assigning at least one IP address to the UE, update the PCRF node with the at least one IP address assigned to the UE;

update the SUPR with information relating to the UE;

enable deep packet inspection of data relating to the UE and the UE's assigned IP address and retrieve user statistics using a Policy and Charging Enforcement Function (PCEF) node;

report information about the user statistics to the PCRF node, forward the information about the user statistics to the SUPR, provide subscriber usage information to application servers requesting the subscriber usage information, provide user profile information deducible from said information about the user statistics information or from user identity information to application servers requesting the user profile information, and store information identifying the application servers requesting the user information, wherein the core network is configured to:

determine that a new IP address has been assigned to the UE; and in response to determining that the new IP address has been assigned to the UE, update the PCRF node with the new IP address and store the new IP address in the SUPR.

16. The network according to claim 15, wherein the gateway is one of a Packet Data Network (PDN) Gateway (PGW) or a Gateway General Packet Radio Service (GPRS) Support Node (GGSN).

17. The network according to claim 15, further comprising at least one of a network address translation entity and a firewall.

* * * * *

UNITED STATES PATENT AND TRADEMARK OFFICE
CERTIFICATE OF CORRECTION

PATENT NO. : 9,197,714 B2  
APPLICATION NO. : 13/500386  
DATED : November 24, 2015  
INVENTOR(S) : Stenfelt et al.

Page 1 of 1

It is certified that error appears in the above-identified patent and that said Letters Patent is hereby corrected as shown below:

In the Specification

In Column 3, Line 36, delete "past" and insert -- part --, therefor.

In Column 4, Line 24, delete "Subscription" and insert -- Subscriber --, therefor.

In Column 7, Line 8, delete "Subscription" and insert -- Subscriber --, therefor.

In the Claims

In Column 7, Line 24, in Claim 1, delete "UE:" and insert -- UE; --, therefor.

In Column 8, Line 17, in Claim 11, delete "subscription" and insert -- subscriber --, therefor.

In Column 8, Line 66, in Claim 13, delete "UE:" and insert -- UE; --, therefor.

Signed and Sealed this  
Twenty-ninth Day of March, 2016

Michelle K. Lee  
*Director of the United States Patent and Trademark Office*